United States Patent [19]

Devanney

[11] 4,375,030

[45] * Feb. 22, 1983

[54] EXTENDED RANGE VARIATOR CONVERSION MECHANISM

[75] Inventor: Raymond H. Devanney, Winsted, Conn.

[73] Assignee: Veeder Industries Inc., Hartford, Conn.

[ * ] Notice: The portion of the term of this patent subsequent to May 26, 1998, has been disclaimed.

[21] Appl. No.: 259,708

[22] Filed: May 1, 1981

Related U.S. Application Data

[63] Continuation-in-part of Ser. No. 70,718, Aug. 29, 1979, Pat. No. 4,269,078.

[30] Foreign Application Priority Data

Aug. 18, 1980 [AU] Australia ............................ 61530/80
Aug. 21, 1980 [EP] European Pat. Off. ........ 80302901.6

[51] Int. Cl.[3] ................................................ F16H 3/22

[52] U.S. Cl. ...................................... 235/61 L; 74/348

[58] Field of Search ............ 235/61 FB, 61 FC, 61 L; 74/348, 354, 342, 681

[56] References Cited

U.S. PATENT DOCUMENTS

| | | | |
|---|---|---|---|
| 2,814,444 | 5/1957 | Bliss | 235/94 R |
| 4,136,573 | 1/1979 | Smilgys et al. | 74/348 |
| 4,269,078 | 5/1981 | Devanney | 74/348 |

*Primary Examiner*—John Gonzales
*Assistant Examiner*—Thomas H. Tarcza
*Attorney, Agent, or Firm*—Prutzman, Kalb, Chilton & Alix

[57] ABSTRACT

Conversion of an extended range mechanical fuel pump computer price variator for selectively substituting an optional $3, $4 or $5 unit volume price adder for an optional $1 or $2 unit volume price adder.

16 Claims, 5 Drawing Figures

EXTENDED RANGE VARIATOR CONVERSION MECHANISM

DESCRIPTION

This is a continuation-in-part of application Ser. No. 070,718, filed Aug. 29, 1979, now U.S. Pat. No. 4,269,078.

TECHNICAL FIELD & BACKGROUND ART

The present invention relates generally to extended range mechanical fuel pump computer price variators of the type disclosed in U.S. Pat. No. 4,136,573 of Bruno S. Smilgys et al, dated Jan. 30, 1979, entitled "Extended Range Fuel Pump Computer Price Variator" and operable for establishing and posting the unit volume price of gasoline within an available unit volume price range extending beyond $0.99 9/10 per unit volume, and more particularly relates to the conversion of such extended range variators to further extend the available price range of the variator.

DISCLOSURE OF INVENTION

Because of the rapidly escalating cost of gasoline, the price for a gallon of gasoline in the not too distant future may exceed the maximum available unit volume price of $1.999 or $2.999 per gallon of conventional extended range variators of the type shown in U.S. Pat. No. 4,136,573. It is therefore a principal aim of the present invention to provide conversion means for modifying or converting existing extended range mechanical variators of the type shown in U.S. Pat. No. 4,136,573 for further extending their available unit volume price range.

It is another aim of the present invention to provide new and improved extended range variator conversion means of the type described which does not substantially increase the variator torque load on its driving fuel meter and which permits field conversion of existing extended range variators with minimum inconvenience and downtime.

It is a further aim of the present invention to provide a new and improved mechanical fuel pump computer price variator having an extended multiple place unit volume price range.

It is another aim of the present invention to provide a new and improved mechanical fuel pump computer price variator settable within a unit volume price range extending above $3 or more.

Other objects will be in part obvious and in part pointed out more in detail hereinafter.

A better understanding of the invention will be obtained from the following detailed description and the accompanying drawings of an illustrative application of the invention.

BEST MODE FOR CARRYING OUT THE INVENTION

Figure 1:
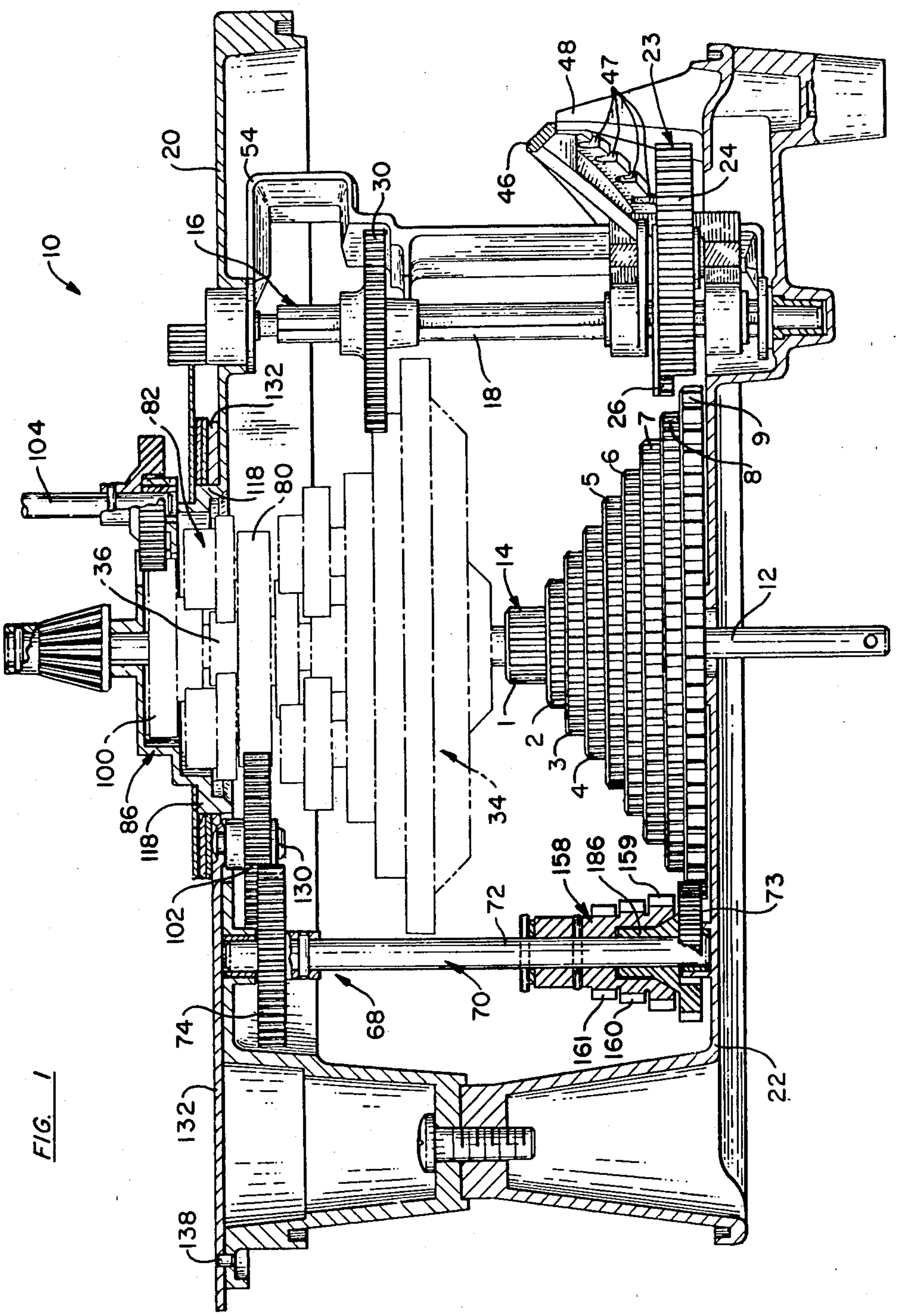
FIG. 1 is an elevation section view, partly broken away and partly in section, of an extended range variator incorporating the present invention.

Referring now to the drawings in detail wherein like reference numerals indicate like parts throughout, there is shown a mechanical fuel pump computer price variator or change speed mechanism 10 of the type disclosed in FIGS. 3-6 of the aforementioned U.S. Pat. No. 4,136,573 which is operable for establishing and posting the unit volume price of gasoline within a multiple place unit volume price range of $0.00 0/10 cents per unit volume to $2.99 9/10 per unit volume in one tenth cent increments.

The variator 10 may be identical to the variator disclosed in FIGS. 3-6 of U.S. Pat. No. 4,136,573 except as hereinafter described and therefore will not be described in detail herein. Briefly, however, the variator 10 comprises a center shaft 12 adapted to be driven by a conventional fuel meter (not shown) of a gasoline dispensing system in accordance with the volume amount of gasoline dispensed. A nine step cone gear or gear stack 14 having gear steps 1-9 with respective numbers of teeth in accordance with the arithmetic progression 1a; 2a . . . 9a (e.g. 8, 16, 24, . . . 72) is mounted on the center shaft 12 for being driven by the shaft 12. Three range arms or take-off gear assemblies 16 (of which only one assembly 16 is shown in FIG. 1), comprising three parallel equiangularly spaced (i.e., 120° spaced) range arm shafts 18 rotatably mounted on the top 20 and base 22 of the variator frame, are provided for selective engagement with the gear steps 1-9 of the cone gear 14. Each range arm assembly 16 has a range arm 23 pivotally and slideably mounted on the respective range arm shaft 18 and adapted to be pivotally and axially positioned for selective engagement of its outer range arm idler gear 24 with each of the steps 1-9 of the central cone gear 14. An inner range arm gear 26 in mesh with the idler gear 24 is keyed to the range arm shaft 18 for rotating that shaft. A respective range arm output gear 30 affixed to the range arm shaft 18 provides an input into a differential summing mechanism 34 having an output gear 36 rotatably mounted on the variator center shaft 12. The relative gear ratios through the three range arms 23 to the summing mechanism output gear 36, via the range arm output gears and differential summing mechanism 34, are in accordance with the geometric progression 1b,10b, 100b such that the three range arms operate to set the amount of the lowest, intermediate and highest places respectively of the lower three places of an available four place unit volume price. Thus, for example, with all three range arms 23 in engagement with the lowest and largest gear step 9 (e.g. having 72 teeth) the established lower three places of the four place unit volume price are 999 (e.g. 99.9 cents per gallon). With all three range arms 23 in engagement with the highest and smallest gear step 1 (e.g. having 8 teeth) the established lower three places of the four place unit volume price are 111 (e.g. 11.1 cents per gallon). Also each range arm 23 may be selectively positioned in a lower position out of engagement with the cone gear 14 and with its idler gear 24 in engagement with a fixed tooth (not shown) integrally formed on the base 22. The range arm output is thereby locked against rotation to, in effect, establish a "0" for the respective place of the multiple place unit volume price. Thus, the three lower place range arms 23 can be selectively set into engagement with the respective fixed teeth (not shown) and the cone gear steps 1–9 to establish any unit volume price within a multiple place price range of 00 0/10 cents to 99 9/10 cents.

Each range arm 23 has a notched generally helical detent rack 46 with ten notches 47 for the ten positions of the range arm 23, and the base 22 is formed with a fixed integral detent finger 48 for each range arm for receipt within each of the ten notches 47 of the range arm 46 for accurately positioning the range arm idler gear 24 in angularly and vertically correlated positions for engagement with the respective fixed lockout tooth (not shown) and the steps 1–9 of the cone gear.

Referring to U.S. Pat. No. 4,136,573, the variator 10 has a set of three aligned numeral price posting wheels 50–52 of ascending order of significance on each of two opposed sides of the variator 10. Each numeral wheel 50–52 is mechanically connected to a bail 54 of the respective range assembly 16 to be angularly positioned in accordance with the pivotal position and therefore the setting of the respective range arm 23. Also the indicia 0–9 on each numberal wheel 50–52 are angularly spaced so that each set of numeral wheels provides for posting the lower three places of the unit volume price from 000 to 999 established by the three range arm settings.

The extended range variator 10 also employs an auxiliary unit volume price adder mechanism 68 for expanding or extending the unit volume price range of the variator from three places to four places. As explained in detail in U.S. Pat. No. 4,136,573, the auxiliary price adder mechanism 68 comprises an auxiliary take-off shaft assembly 70 having a vertical take-off shaft 72 (parallel to and suitably angularly offset from the range arm shafts 18) which is adapted to be driven by the central cone gear 14 by a shaft drive gear 73 (which is constructed in accordance with the present invention and e.g. has eighteen teeth) mounted on the lower end of the auxiliary take-off shaft 72 in engagement with the largest gear step 9. The shaft drive gear 73 thereby provides for connecting the variator center shaft 12 for rotating the auxiliary take-off shaft 72 with a drive ratio of 4:1.

An auxiliary summing differential 82 is mounted coaxially on the center shaft 12 essentially above the differential summing mechanism 34 and immediately below the top or cover 20 of the variator frame, and the output gear 36 of the differential summing mechanism 34 provides one of the two input gears to the auxiliary differential 82. An output gear 100 of the auxiliary differential 82 provides a variator cost output gear adapted to be connected to a conventional fuel pump computer register (not shown, but which for example may be a register of the type disclosed in U.S. Pat. No. 2,814,444 of Harvey N. Bliss, dated Nov. 26, 1957, and entitled "Register") for indexing the usual register cost counters (not shown) for registering the cost amount of fuel dispensed in accordance with the volume amount dispensed and the multiple place unit volume price established by the variator setting. The usual register vertical cost shaft 104 is shown in FIG. 1 to illustrate how the cost counter drive train of the register is connected to the auxiliary differential output gear 100.

The auxiliary summing differential 82 is designed to provide a drive ratio from the center shaft 12, via the gears 9, 73 and the auxiliary take-off shaft 72 for selectively adding a fixed higher place price to the lower three place price established by the setting of the three range arms 23. A fixed higher place price setting of "1" or "2" is adapted to be selectively added to the lower three place price setting where as described, a 4:1 drive ratio is provided between the center shaft 12 and the auxiliary take-off shaft 72.

An idler or selector gear 102 is rotatably mounted on a fixed stub shaft 130 depending from a selector lever 132 rotatably mounted on a cylindrical step 118 of a cover dome 86. The selector gear 102 remains in engagement with a differential input gear 80 of the auxiliary differential 82 and provides three alternatives higher place price settings at three alternative, angularly spaced operating positions of its operating lever 132. In a first lever operating position established by a frame locating pin 138, the selector gear 102 engages a take-off shaft output gear 74 to input a "1" higher place price setting into the auxiliary differential 82. Similarly, in a second lever operating position established by a second frame locating pin (not shown), the selector gear 102 engages an idler gear (not shown but which is driven by the take-off shaft output gear 74 via an intermediate compound gear, not shown) to input a "2" higher place price setting into the auxiliary differential 82. In the third selector lever operating position established by a third frame locating pin (not shown), the selector gear 102 is held out of engagement with the two drive gears and in operative engagement with a depending fixed tooth (not shown) of the variator cover 20 to input a "0" higher place price setting into the auxiliary differential 82.

Figure 4:
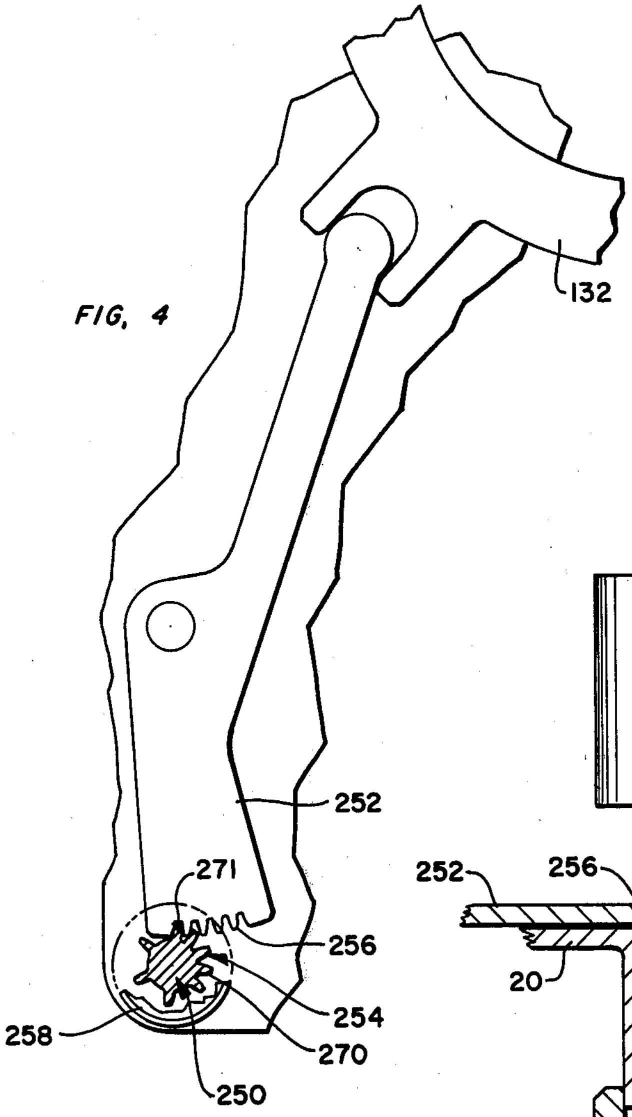
FIG. 4 is a reduced partial top plan view, partly broken away and partly in section, of the extended range variator, showing a dollar price posting wheel mechanism thereof.
Figure 5:
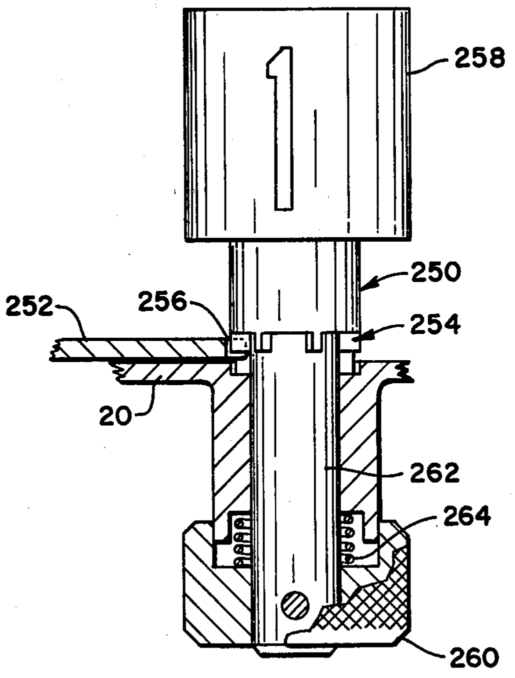
FIG. 5 is an enlarged partial front elevation view, partly broken away and partly in section, of the dollar price posting wheel mechanism.

Referring to FIGS. 4 and 5, a fourth place rotary price posting wheel 250 constructed in accordance with the present invention is provided in alignment with each set of price posting wheels to display a fourth place price of "0", "1" or "2" as established by the price adder mechanism (or a fourth place price of "3", "4" or "5" as hereinafter described). In that regard, when the selector gear 102 is pivoted to its "0", "1" and "2" adder positions, the price posting wheel 250 is rotated (by the selector operating lever 132 via a bellcrank or lever 252 having a gear sector 256 engaging a gear 254 of the price wheel 250) to corresponding angular positions where its numeral bearing rim 258 displays "0", "1" and "2" respectively.

Figure 2:
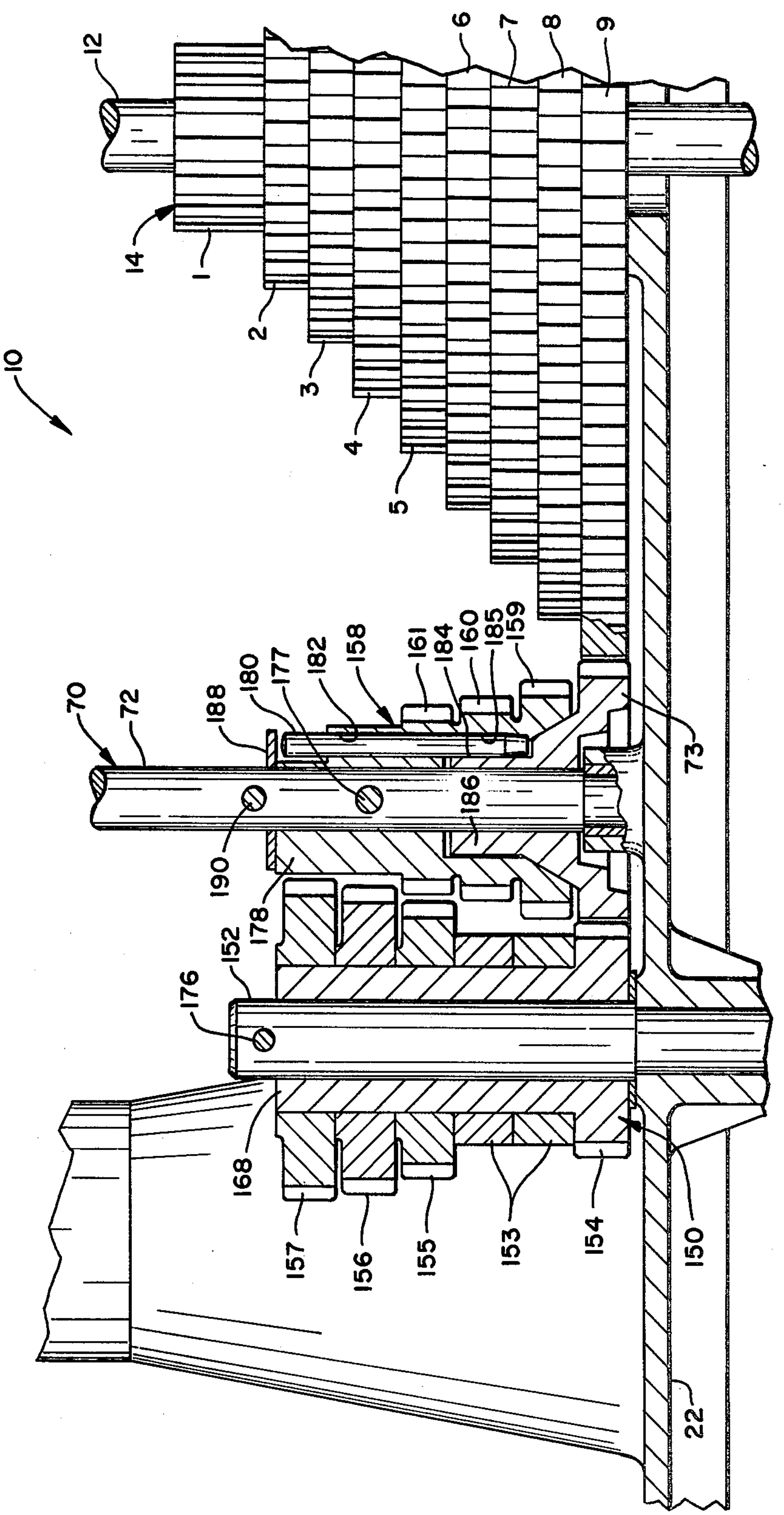
FIG. 2 is an enlarged partial elevation section view, partly broken away and partly in section, of the extended range variator.
Figure 3:
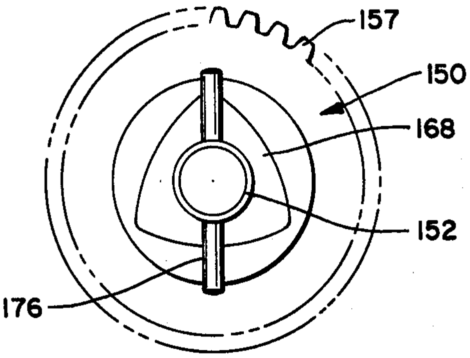
FIG. 3 is a top plan section view of an auxiliary compound gear assembly of the extended range variator.

Pursuant to the present invention, and referring now particularly to FIG. 2, the extended range fuel pump price variator is modified by installing an auxiliary compound gear 150 on an auxiliary stub shaft 152 upstanding from the base 22 of the variator frame parallel and adjacent to the auxiliary take-off shaft 72. The auxiliary compound gear 150 is an assembly of interchangeable gears which are keyed together for common rotation. The compound gear assembly 150 comprises a lower relatively small diameter spur gear 154 (e.g., having fifteen teeth) in engagement with the take-off shaft drive gear 73, a stack of two spacers 153 and three separate, relatively large diameter spur gears 155, 156 and 157 of increasing diameter (having different tooth pitches and e.g. twenty, twenty and twenty-five teeth, respectively). In addition, a cone or compound drive gear 158 is mounted on the take-off shaft 72 above the take-off shaft drive gear 73 to be selectively driven by the three spur gears 155–157 of the auxiliary compound gear 150 depending on how the spur gears 155–157 and spacers 153 are stacked on an elongated upstanding hub 168 of the lower spur gear 154. More particularly, the cone gear 158 has three gear steps 159, 160, 161 of decreasing diameter (having different tooth pitches and e.g. sixteen, twelve and twelve teeth respectively). The lowest and largest cone gear step 159 is adapted to be selectively driven by the spur gear 155 to provide a "3" auxiliary higher place price (with the selector lever 132 in its "2" position). The intermediate cone gear step 160 is adapted to be selectively driven by the spur gear 156 to provide a "4" auxiliary higher place price (with the selector lever 132 in its "2" position). And the top cone gear step 161 is adapted to be selectively driven by the spur gear 157 to provide a "5" auxiliary higher place price (with the selector lever in its "2" position). For that purpose, the two spacers 153 and the three gear steps 155–157 of the compound gear 150 can be selectively mounted on the upstanding hub 168 of the lowest spur gear 154 for engagement of any selected spur gear 155–157 with the cooperating cone gear step 159–161 respectively. Also, referring to FIG. 3, the upstanding hub 168 has a generally triangular cross-section and the two spacers 153 and three gear steps 155–157 have conforming generally triangular bores for keying the spacers 153 and gear steps 155–157 to the hub for uniform rotation with the lower drive gear 154. A retaining pin 176 can be temporarily removed from a transverse bore in the stub shaft 152 for repositioning the spacers 153 and gears 155–157 on the hub 168.

The cone gear 158 is coupled to the take-off shaft 72 with a drive pin 177 inserted through aligned transverse bores in the shaft 72 and in an axially upwardly projecting hub 178 of the cone gear 158. The lower take-off shaft drive gear 73 is adapted to be selectively coupled to the take-off shaft 72 with an axial or vertical drive pin 180 which is inserted downwardly through an axial bore 182 in the cone gear 158 and into angularly aligned axial slots 184, 185 in an upwardly axially projecting hub 186 of the lower take-off shaft drive gear 73 and in the upper cone gear 158. With the drive pin 180 installed, the take-off shaft drive gear 73 is coupled directly to the take-off shaft 72 (via the cone gear 158) and the shaft 72 is thereby driven directly by the cone gear 14 via the gear 73 to provide a fixed 4:1 drive ratio from the center shaft 12 for selectively adding an auxiliary "1" or "2" higher place price with the selector lever 132 as previously described. A drive pin retaining washer 188 is mounted above the cone gear 158 and held in position by a transverse pin 190 for retaining the drive pin 180 against inadvertent withdrawal. The drive pin 180 can therefore be removed after first removing the retaining pin 190 and lifting the retaining washer 188.

The upper take-off shaft drive gear 158 remains coupled to the take-off shaft 72 when the lower drive gear 73 is directly coupled to the shaft 72 as described. In that case, the stack of gears 155–157 and spacers 153 are mounted on the hub 168 to position the gears 155–157 out of engagement with the cone gear 158 as shown in FIG. 2. By removing the drive pin 180 from the lower drive gear 73 (to uncouple the gear 73 from the shaft 72), the stack of gears 155–157 and spacers 153 can then be mounted on the hub 168 for driving the take-off shaft cone gear 158 with one of those gears 155–157 as previously described. In that case, the take-off shaft 72 is driven by the center shaft 12 via the cone gear step 9, lower take-off shaft drive gear 73, auxiliary compound gear 150 and the upper cone gear 158 to provide a 6:1; 8:1; or 10:1 drive ratio from the center shaft 12 to the auxiliary take-off shaft 72 (depending on which set of gears 155 and 159; 156 and 160; or 157 and 161, is used). Those three alternative gear trains thereby provide for increasing the drive ratio to the take-off shaft 72 by a factor of 3/2, 2 and 5/2 respectively to establish an auxiliary "3", "4" or "5" higher place price (with the selector lever 132 in its "2" position).

The lower take-off shaft drive gear 73 and the upper auxiliary cone gear 158 are mounted on the take-off shaft 72 with the axially upwardly extending hub 186 of the lower drive gear 73 received within a lower enlarged bore or pocket of the auxiliary cone gear 158. That arrangement provides for positioning the cone gear steps 159–161 immediately above the shaft drive gear 73 to minimize the required length of the auxiliary stub shaft 152 and therefore the transverse force moment on the stub shaft 152 (resulting from the torque transmitted from the compound gear 150 to the cone gear 158). As a result, the required support in the variator frame base 22 for maintaining the stub shaft 152 parallel to the axis of the take-off shaft is minimized.

Accordingly, the conversion mechanism provides for selectively substituting an optional $3, $4 or $5 adder for the optional $2 adder for expanding or extending the maximum available unit volume price of the variator from $2.999 to $3.999; $4.999 to $5.999.

When the auxiliary compound gear 150 is set to establish a $3, $4 or $5 adder as described, the auxiliary price posting wheel 250 is manually rotated from its "2" angularly display position to its "3", "4" or "5" angular display position as appropriate. For that purpose, the auxiliary price posting wheel 250 is mounted on the variator frame so that it can be manually axially shifted upwardly out of engagement with the bellcrank gear sector 256 and then manually rotated to its "3", "4" or "5" angular display position. A knurled knob 260 mounted on the lower end of a wheel shaft 262, is biased downwardly by a compression spring 264 to hold the wheel in its lower operating position in engagement with the gear sector 256. By pushing the knob 260 upwardly to disengage the wheel from the gear sector 256 and then rotating the knob 260, the price wheel 250 can be readily angularly reset to display the appropriate "3", "4" or "5" fourth place price setting.

The price wheel gear 254 is designed so that the price wheel 250 can be manually reset only when the selector lever 252 is in its "2" position and then only to an exact "3", "4" or "5" display position. For that purpose, the price wheel gear 254 has a gear sector 270 which limits rotation of the price wheel 250 by the bellcrank 252 to only its "0", "1" and "2" angular display positions. All of the teeth of the wheel gear sector 270 except the last tooth 271 are sufficiently long to prevent axial disengagement of the wheel gear 254 from the bellcrank sector gear 256 except when the wheel 250 is in its "2" display position. The wheel gear 254 also comprises three angularly spaced detent teeth for the "3", "4" and "5" positions of the wheel which, like the last tooth 271 of the gear sector 270, are short enough for manually disengaging the wheel 250 from the bellcrank sector gear 256 as described for resetting the wheel 250.

Conversion of the auxiliary price adder mechanism to extend the unit volume price range of the variator to $3, $4 or $5 is thereby provided by the installation of two additional compound gears 150, 158, a stub shaft 152 mounted on the variator base 22 for supporting the compound gear 150, a transverse pin 176 mounted on the upper end of the stub shaft 152 for retaining the compound gear 150 in position, and a substitute take-off shaft drive or input gear 73 designed to receive the drive pin 180. Also, a substitute price wheel 250 is provided for selectively posting the $3, $4 or $5 fourth place adder.

Similarly, it is contemplated that alternative multiple-step compound gears (not shown) could be employed in place of the described multiple-step compound gears 150, 158 to provide different drive ratios between the variator center shaft 12 and the take-off shaft 72. For example, such alternative multiple step compound gears (not shown) could be employed to provide different drive ratios, for example to provide optional $2.50, $3 and $3.50 adders in place of the described optional $3, $4 and $5 adders or to provide for example $2, $3 and $4 adders in the "1" position of the selector lever 132 (for example, if a "2" adder setting of the selector lever 132 is not provided as shown in the embodiment of FIGS. 1 and 2 of U.S. Pat. No. 4,136,573). Of course, a suitable alternative price posting mechanism (not shown) would be provided for posting the appropriate unit volume price established by the variator setting.

As will be apparent to persons skilled in the art, various modifications, adaptations and variations of the foregoing specific disclosure can be made without departing from the teachings of the present invention.

I claim:

1. In an extended range unit volume price variator settable for establishing the amount of each place of a multiple place unit volume price and having a rotary input with a primary stack of coaxial gears adapted to be rotated by a fluid meter in accordance with the volume amount of metered fluid; a plurality of rotatable drive range arm assemblies for a plurality of places of ascending order respectively of the multiple place unit volume price having respective rotatable range arm shafts with axes radially offset from and generally parallel to the axis of the primary gear stack, respective range arms pivotally and axially shiftable on the respective range arm shafts for selective engagement with the primary stack of gears for rotating the respective range arm shafts therewith, and a range arm output gear on each range arm shaft; a rotary differential gear mechanism coaxial with the primary gear stack in engagement with the range arm output gears for combining the rotatable drives through the range arms with relative drive ratios in accordance with their respective places; and an auxiliary higher place price selector mechanism for establishing a next higher place price to said plurality of places of ascending order and having an auxiliary rotatable drive take-off assembly with a rotatable take-off shaft generally parallel to and radially offset from the primary gear stack, a take-off shaft input gear driven by the rotary input and rotatably mounted on the take-off shaft for being coupled to the take-off shaft, and an auxiliary take-off shaft driven gear driven by the take-off shaft; a rotary auxiliary differential in operative engagement with said differential gear mechanism; and an auxiliary higher place selector with a shiftable selector lever shiftable between a plurality of operational positions thereof and a selector gear rotatably mounted on the selector lever for operatively interconnecting the auxiliary take-off shaft driven gear and auxiliary differential in a first operational position of the selector lever; the auxiliary differential being operable for combining the rotatable drives through the differential gear mechanism and selector gear with relative drive ratios in accordance with the respective places of the unit volume price and whereby, with the take-off shaft input gear coupled to the take-off shaft, the selector lever is adapted to be selectively shifted to its said first position for selectively establishing a said next higher place whole number price of a; the improvement wherein the extended range variator further comprises a standby conversion mechanism for selectively converting the auxiliary higher place price selector mechanism for selectively establishing a said next higher place whole number price of b, the standby conversion mechanism comprising an auxiliary compound gear with a plurality of gears including first and second gears, means for rotatably supporting the auxiliary compound gear with said first gear thereof in operative engagement with said take-off shaft input gear to be driven thereby, a first take-off shaft drive gear mounted on the take-off shaft for operative engagement by said second gear of said compound gear and for rotating the take-off shaft, and means for selectively coupling said take-off shaft input gear to the take-off shaft for selectively driving the shaft directly with said input gear at a first drive ratio and alternatively via the compound gear and said first take-off shaft drive gear at a second drive ratio which is b/a times the said first drive ratio for selectively establishing a said next higher place price of b with the selector lever in its said first position.

2. In an extended range unit volume price variator settable for establishing the amount of each place of a multiple place unit volume price and having a rotary input with a primary stack of coaxial gears adapted to be rotated by a fluid meter in accordance with the volume amount of metered fluid; a plurality of rotatable drive range arm assemblies for a plurality of places of ascending order respectively of the multiple place unit volume price having respective rotatable range arm shafts with axes radially offset from and generally parallel to the axis of the primary gear stack, respective range arms pivotally and axially shiftable on the respective range arm shafts for selective engagement with the primary stack of gears for rotating the respective range arm shafts therewith, and a range arm output gear on each range arm shaft; a rotary differential gear mechanism coaxial with the primary gear stack in engagement with the range arm output gears for combining the rotatable drives through the range arms with relative drive ratios in accordance with their respective places; and an auxiliary price adder mechanism for adding a predetermined unit volume price adder to the unit volume price established by said plurality of range arms and having an auxiliary rotatable drive take-off assembly with a rotatable take-off shaft generally parallel to and radially offset from the primary gear stack, a take-off shaft input gear driven by the rotary input and rotatably mounted on the take-off shaft for being coupled for directly rotating the take-off shaft therewith, and a take-off shaft driven gear driven by the take-off shaft; and a rotary auxiliary differential operatively connected for combining the rotatable drives through the differential gear mechanism and the take-off shaft driven gear with relative drive ratios establishing, with the take-off shaft input gear coupled for directly rotating the take-off shaft, a predetermined price adder of a; the improvement wherein the extended range variator comprises a standby conversion mechanism for selectively converting the auxiliary price adder mechanism for establishing a predertermined price adder of b; the conversion mechanism comprising an auxiliary compound gear with a plurality of gears including first and second gears of different diameters respectively, means for rotatably supporting the auxiliary compound gear with said first gear thereof in operative engagement with said take-off shaft input gear to be driven thereby, a take-off shaft drive gear mounted on the take-off shaft for operative engagement by said second gear of said compound gear for rotating the take-off shaft therewith, and means for selectively coupling said take-off shaft input gear to the take-off shaft for selectively driving the shaft directly with said input gear at a first drive ratio for establishing a price adder of a and via the compound gear and take-off shaft drive gear at a second drive ratio which is b/a times the said first drive ratio for establishing a said price adder of b.

3. A standby conversion mechanism for an extended range unit volume price variator settable for establishing the amount of each place of a multiple place unit volume price and having a rotary input with a primary stack of coaxial gears adapted to be rotated by a fluid meter in accordance with the volume amount of metered fluid; a plurality of rotatable drive range arm assemblies for a plurality of places of ascending order respectively of the multiple place unit volume price having respective rotatable range arm shafts with axes radially offset from and generally parallel to the axis of the primary gear stack, respective range arms pivotally and axially shiftable on the respective range arm shafts for selective engagement with the primary stack of gears for rotating the respective range arm shafts therewith, and a range arm output gear on each range arm shaft; a rotary differential gear mechanism coaxial with the primary gear stack in engagement with the range arm output gears for combining the rotatable drives through the range arms with relative drive ratios in accordance with their respective places; and an auxiliary price adder mechanism for adding a predetermined unit volume price adder to the unit volume price established by said plurality of range arms and having an auxiliary rotatable drive take-off assembly with a rotatable take-off shaft generally parallel to and radially offset from the primary gear stack, a take-off shaft input gear driven by the rotary input and rotatably mounted on the take-off shaft for being coupled for directly rotating the take-off shaft therewith, and a take-off shaft driven gear driven by the take-off shaft; a rotary auxiliary differential operatively connected to the differential gear mechanism and the take-off shaft driven gear for combining the rotatable drives through the differential gear mechanism and the take-off shaft driven gear with relative drive ratios establishing, with the take-off shaft input gear coupled for directly rotating the take-off shaft, a predetermined price adder of a; the standby conversion mechanism being operable for selectively converting the auxiliary price adder mechanism for establishing a predetermined price adder of b, the conversion mechanism comprising a compound gear with a plurality of gears including first and second relative small and large diameter gears respectively, means for rotatably supporting the compound gear with the first relatively small diameter gear thereof in operative engagement with said take-off shaft input gear to be driven thereby, a first take-off shaft drive gear adapted to be mounted on the take-off shaft in operative engagement with the second relatively large diameter gear of said compound gear and for rotating the take-off shaft, the take-off shaft input gear being adapted to be selectively coupled to the take-off shaft for selectively driving the shaft directly with said take-off shaft input gear at a first drive ratio and via the compound gear and first take-off shaft drive gear at a second drive ratio which is b/a times said first drive ratio for selectively establishing a said price adder of b.

4. In an extended range unit volume price variator settable for establishing the amount of each place of a multiple place unit volume price and having a rotary input with a primary stack of coaxial gears adapted to be rotated by a fluid meter in accordance with the volume amount of metered fluid; a plurality of rotatable drive range arm assemblies for a plurality of places of ascending order respectively of the multiple place unit volume price adapted for selective engagement with the primary stack of gears; a rotary differential gear mechanism coaxial with the primary gear stack for combining the rotatable drives through the range arm assemblies with relative drive ratios in accordance with their respective places; and an auxiliary price adder mechanism for adding a predetermined unit volume price adder to the unit volume price established by said plurality of range arm assemblies and having an auxiliary rotatable drive take-off assembly with a rotatable take-off shaft generally parallel to and radially offset from the primary gear stack, a take-off shaft input gear driven by the rotary input and rotatably mounted on the take-off shaft for being coupled for directly rotating the take-off shaft therewith, and a take-off shaft driven gear driven by the take-off shaft; and a rotary auxiliary differential operatively connected for combining the rotatable drives through the differential gear mechanism and the take-off shaft driven gear with relative drive ratios establishing, with the take-off shaft input gear coupled for directly rotating the take-off shaft, a first predetermined price adder; the improvement wherein the extended range variator comprises a standby conversion mechanism for selectively converting the auxiliary price adder mechanism for establishing a different predetermined price adder; the conversion mechanism comprising an auxiliary compound gear rotatably supported for being continuously driven by the rotary input, a first auxiliary take-off shaft drive gear mounted on the take-off shaft for operative engagement with said auxiliary compound gear for rotating the take-off shaft therewith, and means for selectively coupling said take-off shaft input gear to the take-off shaft for selectively driving the shaft directly with said input gear at a first drive ratio for establishing said first predetermined price adder and via said auxiliary compound gear and said first take-off shaft drive gear at a second drive ratio different than said first drive ratio for establishing a said different predetermined price adder.

5. An extended range unit volume price variator according to claim 1, 2, 3 or 4 wherein said take-off shaft input gear is mounted on the take-off shaft in operative engagement with one of the gears of the primary gear stack, and wherein the said first take-off shaft drive gear is mounted on the take-off shaft above said take-off shaft input gear.

6. An extended range unit volume price variator according to claim 1, 2 or 4 wherein said selective coupling means is operable for selectively coupling said take-off shaft input gear to said first take-off shaft drive gear.

7. An extended range unit volume price variator according to claim 1, 2 or 3 wherein the plurality of gears of the auxiliary compound gear includes a third gear, and further comprising a second take-off shaft drive gear mounted on the take-off shaft for operative engagement by said third gear of said compound gear and for rotating the take-off shaft at a third drive ratio which is b+1/a times said first drive ratio for selectively establishing a next higher place price of b+1.

8. An extended range unit volume price variator according to claims 1, 2 or 3 wherein the plurality of gears of the auxiliary compound gear are separate gears and the auxiliary compound gear comprises mounting means for selectively stacking the gears of the compound gear together for selective operative engagement of the compound gear with each take-off shaft drive gear.

9. An extended range unit volume price variator according to claim 8 wherein the mounting means of the compound gear is formed by an elongated hub on the said first gear of the auxiliary compound gear and each remaining gear of said plurality of gears of the auxiliary compound gear is adapted to be selectively mounted on said elongated hub for selective engagement with a respective take-off shaft drive gear for rotation of the take-off shaft.

10. An extended range unit volume price variator according to claim 7 wherein the take-off shaft drive gears are provided by a cone gear mounted on the take-off shaft.

11. An extended range unit volume price variator according to claim 1, 2 or 3 wherein b is equal to a+1.

12. An extended range unit volume price variator according to claim 6 wherein said selective couping means comprises a drive pin and wherein said take-off shaft input gear and said first take-off shaft drive gear have axially extending openings for receiving said drive pin for coupling the gears together.

13. An extended range unit volume price variator according to claim 10 wherein said take-off shaft input gear has an axially extending mounting hub for rotatably mounting said input gear on the take-off shaft and wherein the take-off shaft cone gear has a central axial pocket at one axial end thereof receiving said input gear mounting hub.

14. An extended range unit volume price variator according to claim 1 wherein the variator has a rotary price posting mechanism comprising a rotary price posting wheel for posting said next higher place price, the price posting wheel having a driven gear with a first driven gear sector and a locating tooth for locating the price wheel at a b display position thereof, and means connecting the price wheel to the selector lever including a pivotal link with a second drive gear sector engageable with the first driven gear sector for rotating the price wheel with the selector lever to an a display position thereof when the selector lever is shifted to its said first position, means mounting the price wheel for being manually axially shifted in one direction from an operational axial position thereof to disengage said first and second gear sectors to permit the price posting wheel to be manually rotated to its said b display position and thereby position the locating tooth for reengagement with said second gear sector to lock the price wheel at its said b display position when it is returned to its said operational axial position.

15. An extended range unit volume price variator according to claim 14 wherein one of said gear sectors has a plurality of axially elongated teeth to prevent said manual disengagement of said first and second gear sectors except when the selector lever is in its said first position.

16. An extended range unit volume price variator according to claim 1 wherein the variator has a rotary price posting mechanism having a rotary price posting wheel with a first driven gear sector for posting said next higher place price, pivotal linkage means connected to the selector lever having a second drive gear sector engageable with the first driven gear sector for rotating the price wheel to an a display position thereof when the selector lever is shifted to its said first position, the price wheel having means to permit manually rotating the price wheel to a b display position thereof when the selector lever is in its said first position and to lock the selector lever in its said first position while the price posting wheel is in its said b display position.

* * * * *